UNITED STATES PATENT OFFICE.

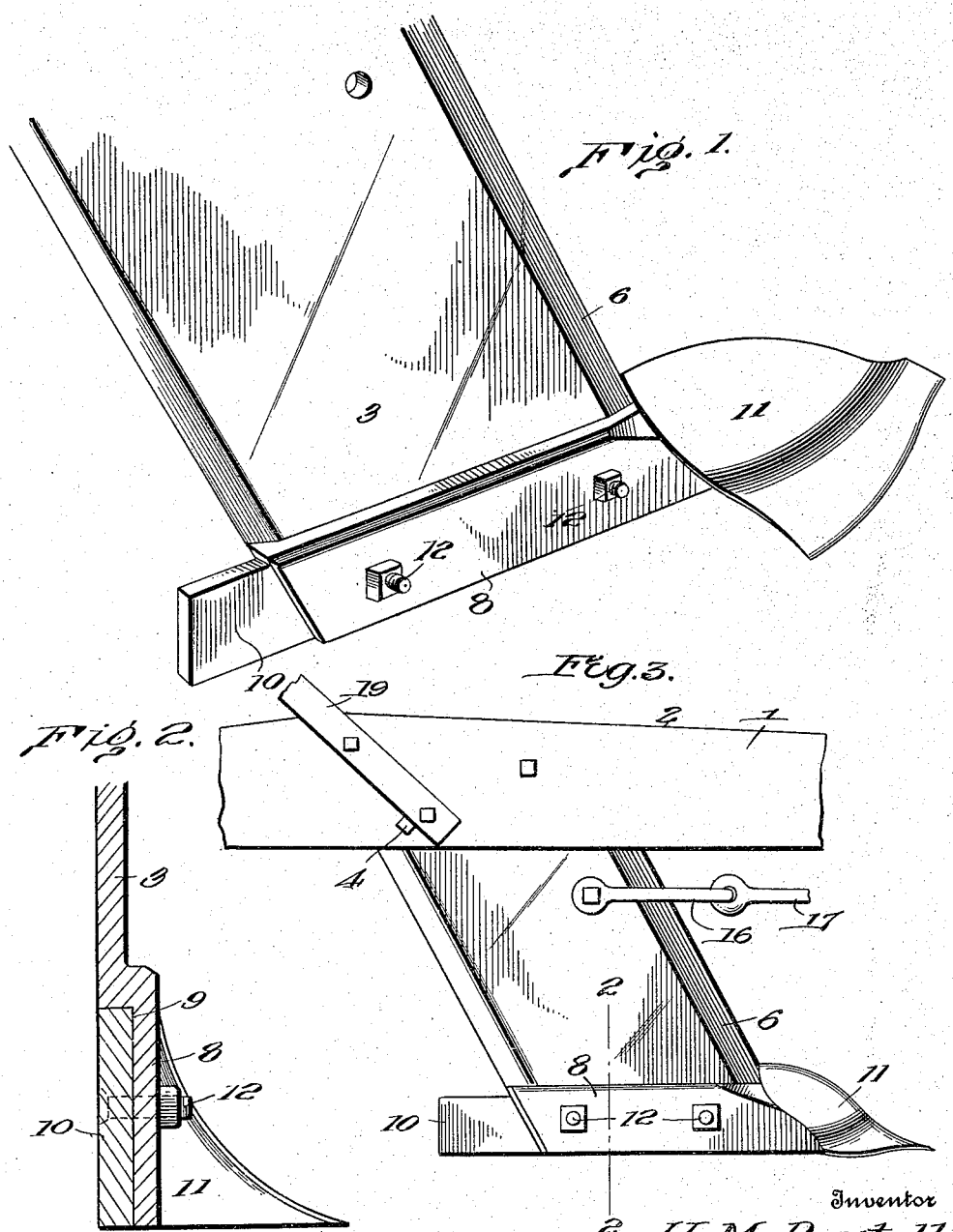

HUSS M. BEUTELL, OF NORCROSS, GEORGIA.

GROUND ROOT-CUTTER.

1,170,795.  Specification of Letters Patent.  Patented Feb. 8, 1916.

Application filed April 1, 1915. Serial No. 18,584.

*To all whom it may concern:*

Be it known that I, HUSS M. BEUTELL, a citizen of the United States, residing at Norcross, in the county of Gwinnett and State of Georgia, have invented certain new and useful Improvements in Ground Root-Cutters, of which the following is a specification.

This invention relates to improvements in a new ground root cutting implement.

The object of the invention is to provide a simple and economical root cutter provided with a short point to penetrate into the ground, and a wide and relatively thin upright standard sharpened at its front and beveled at the rear to quickly sever the roots, that the point fails to cut.

The invention also comprehends improvements in the details of construction and arrangement of parts which will be hereinafter described and particularly pointed out in the claim.

In the accompanying drawings: Figure 1 is a perspective view of my improved ground or root cutting implement. Fig. 2 is a vertical section of the same on the line 2—2 of Fig. 3. Fig. 3 is a side elevation.

1 indicates a plow beam, which is preferably formed by two spaced members 2—2, between which fit a downwardly and forwardly inclined combined upright and standard 3. The inclined upright or standard is relatively wide longitudinally of the beam and is relatively thin in cross section, and is bolted to the beam at 4. The inclined upright or standard is sharpened on its front edge as at 6, and is beveled on its back edge as shown. The lower end of the upright or standard has formed integral therewith an offset portion 8, adjacent same, and under the bottom of the upright or standard is a recess 9, to form a seat for a comparatively narrow steel land side or bar 10, having a cutting point 11, the land side and point being forged from one piece of steel. The land side 10 and its point 11 is to be bolted to the offset portion by two bolts 12, and when assembled in the recess 9, the outer surface is flush with the outer surface of the incline upright or standard as clearly shown in Fig. 2.

The root cutting point 11, as noted, is short and extends forwardly of the upright or standard and is slightly concave near the point, then convex up to and connecting at upright or standard, from the point backward, the point is flared outwardly on one side to extend a slight distance beyond the surface of the offset portion 8, on the upright or standard so as to penetrate the ground in cutting roots, and to present same to the forward cutting edge 6, of the upright or standard, the outer surface of the land side and root cutting point merging into and is in line with the forward cutting edge 6, as shown in Fig. 2.

As a further development of the invention I have shown in Figs. 5, 6 and 7, a different form of application of the land side and root cutting point combined to the upright or standard, which is similar to the one previously described, except that it has no offset portion, and the land side 13, with combined root cutting point 11, is bolted on the outside of said upright or standard. In this construction the outer surface of the land side is displaced from the vertical alinement of the forward cutting edge of the upright or standard, but the same land side and root cutting point combined may be used in connection with either form of upright or standard.

Fig. 4 shows attachment of inclined upright or standard as attached to a plow beam, and shows draft rod connections through yoke 18, on the front end of the beam to which animals may be attached.

In operation, as the implement is drawn forwardly, the root cutting point 11, penetrates the ground, and the forward cutting point 11, cuts and raises roots up to and against cutting edge of the upright or standard and severs the same, and because of the thickness of the upright or standard, little friction is caused while operating the implement.

What I claim as new and desire to secure by Letters Patent, is:—

In an implement of the class set forth, the combination with a plow beam, of a downwardly and forwardly inclined upright secured to the beam, the forward edge of said upright being provided with a cutting face, the lower portion of said upright being offset to form a recess in line with the body of the upright, a member fitting said recess and lying flush with the body of said upright, a plurality of bolts passing through said member and the aforesaid portion formed by said recess, and an outwardly and upwardly inclined cutting blade formed integral with said member and located substantially in line with the cutting edge of said upright, the lower portion of said cutting blade lying in the same plane as the lower edge of said upright.

In testimony whereof I affix my signature in presence of two witnesses.

HUSS M. BEUTELL.

Witnesses:
D. K. JOHNSTON,
H. J. SIMONTON.

Copies of this patent may be obtained for five cents each, by addressing the "Commissioner of Patents, Washington, D. C."